(12) United States Patent
Douglass et al.

(10) Patent No.: US 8,215,897 B2
(45) Date of Patent: Jul. 10, 2012

(54) CYLINDRICAL WIND TURBINE

(76) Inventors: Karl J. Douglass, Dublin, PA (US);
Francis J. McCabe, Dublin, PA (US);
Robert Dickie, Dublin, PA (US)

( * ) Notice: Subject to any disclaimer, the term of this patent is extended or adjusted under 35 U.S.C. 154(b) by 635 days.

(21) Appl. No.: 12/332,461

(22) Filed: Dec. 11, 2008

(65) Prior Publication Data

US 2010/0150728 A1    Jun. 17, 2010

Related U.S. Application Data

(60) Provisional application No. 61/014,159, filed on Dec. 17, 2007.

(51) Int. Cl.
*F03D 7/00* (2006.01)
*F03D 7/06* (2006.01)
*F03D 3/00* (2006.01)

(52) U.S. Cl. .............. 415/4.2; 415/4.4; 290/44; 290/55; 416/197 A

(58) Field of Classification Search ............ 415/4.2, 415/4.4, 907; 416/197 A; 290/44, 55
See application file for complete search history.

(56) References Cited

U.S. PATENT DOCUMENTS

| | | | |
|---|---|---|---|
| 4,047,834 A | | 9/1977 | Magoveny et al. |
| 4,115,027 A | * | 9/1978 | Thomas .................. 415/53.1 |
| 4,191,507 A | * | 3/1980 | DeBerg .................... 416/117 |
| 4,952,119 A | | 8/1990 | Widseth |
| 5,038,049 A | | 8/1991 | Kato |
| 5,463,257 A | | 10/1995 | Yea |
| 5,518,367 A | | 5/1996 | Verastegui |
| 6,688,842 B2 | | 2/2004 | Boatner |
| 6,808,366 B2 | | 10/2004 | Sikes |
| 6,872,045 B1 | | 3/2005 | Weaver et al. |
| 6,984,899 B1 | | 1/2006 | Rice |
| 7,084,523 B2 | | 8/2006 | Noguchi |
| 7,186,083 B2 | | 3/2007 | Bayly |
| 7,215,039 B2 | | 5/2007 | Zambrano et al. |
| 7,230,348 B2 | | 6/2007 | Poole |
| 2007/0126240 A1 | | 6/2007 | Richards et al. |
| 2008/0213083 A1 | * | 9/2008 | Unno ......................... 415/4.2 |
| 2008/0273978 A1 | * | 11/2008 | Watkins ................. 416/197 A |

* cited by examiner

*Primary Examiner* — Michelle Mandala
(74) *Attorney, Agent, or Firm* — Gregory J. Gore

(57) ABSTRACT

A vertical wind turbine includes a blade which has opposite force producing sides that lie on opposite sides of the longitudinal axis along its direction of travel. The aerodynamic surfaces are driven by the wind through four phases of rotation. Driving torque is produced during three of the four phases. The blade includes a v-shaped nosepiece with rearward facing surfaces on each side that cup the wind during three of the four phases. The split tail of the blade captures the wind during a down wind phase of rotation.

9 Claims, 4 Drawing Sheets

PHASE 2

CYLINDRICAL WIND TURBINE

RELATED APPLICATION

This patent application is related to Provisional Application No. 61/014,159 filed Dec. 17, 2007 priority from which is hereby claimed.

FIELD OF THE INVENTION

The present invention relates to wind energy machines; more specifically, it relates to devices which include an array of elongate rotating blades which are disposed parallel with the central axis of rotation of the array.

BACKGROUND OF THE INVENTION

Devices which capture energy from the wind that include rotational means about an axis which is parallel to an array of blades are most commonly disposed perpendicular to the ground and are therefore generally referred to as "vertical windmills." This orientation allows the wind machine to be omnidirectional with respect to the airflow, which in most places is parallel to the ground. An example of such a wind device is shown in U.S. Pat. No. 7,084,523 depicted in FIG. 1. Although the blades are different, this is a structural example of a simple fixed-wing vertical windmill similar to the invention which includes blades 2 which are supported by arms 5 that connect the blades to a central axial member 1 which supports the blades and transmits the rotational energy caused by their movement.

It is also known in the field of wind energy devices to construct blades or wings which can capture the force of the airflow in different ways. One known blade configuration is shown in U.S. Pat. No. 5,599,172 issued to McCabe, depicted herein in FIG. 2. The cross-sectional shape of this blade shows that it comprises essentially a planar face portion B and leading and trailing edges A and C at opposite ends of the face portion respectively. Attached to the trailing edge is a flange, D that cups the wind. The resulting construction is an inverted pan-shaped blade. It is theorized that this blade shape captures air rather than letting it pass freely through the apparatus. This pan-shaped blade has two effects. First, it causes aerodynamic lift. Secondly, the adjacent blade can enhance the lift. This device operates best with the airfoils at significantly shallower angles than windmills using standard airfoils. Thus, the device will not continuously accelerate and burn up because the relative wind change due to rotation reduces lift, acting as a braking action as the angle of attack approaches the zero lift range. In operation, this means that the device collects as much force as possible even though it is going slower rather than faster, as in the prior art. For example, in a 60 to 65 mph wind, the maximum speed would be approximately 100 revolutions per minute (rpm).

SUMMARY OF THE INVENTION

Utilizing similar structures inspired by the McCabe blade as shown in FIG. 2, the applicant has altered the geometry of the blade, reversed its direction of travel and utilized in a Newtonian blade construction that has opposite force-producing sides which lie on opposite sides of a longitudinal axis that is tangent to the circular path of rotation in the direction of travel. This blade or airfoil includes a pointed nosepiece added to the leading edge to reduce drag. Also novel is adapting an alteration of this blade configuration to a cylindrically rotating windmill, i.e. a crosswind axis windmill, that may be vertically oriented. The result is a significant increase in power developed due to the additional forces produced during multiple phases of rotation, as further explained below.

More specifically, the Applicant has devised a vertical windmill comprising at least one airfoil or blade continuously rotatable about a vertical axis in a direction of rotation, the airfoil having a head at a leading end and a tail at a trailing end of windmill including means for supporting the airfoil so that it travels in a circular path in a horizontal plane about the axis. The airfoil includes aerodynamic surfaces for being driven by wind through four different phases of rotation relative to a wind direction, the phases occurring approximately 90 degrees apart within each 360 degrees of travel of the airfoil about the axis. In a first phase of rotation, the airfoil travels laterally across the wind direction during which a forward net driving force is exerted on the airfoil by the wind in a first lateral direction of travel. In a second phase of rotation, the airfoil travels downwind in the direction of said wind and is driven forward by the force of air captured by the tail and rearward facing surfaces or flanges on the leading end of the airfoil. In a third phase of rotation, the airfoil travels laterally across the wind direction in a second lateral direction of travel opposite the direction of travel during the first phase whereby a net forward driving force is exerted on the airfoil by the wind in the second lateral direction of travel. In a fourth phase of rotation, the airfoil travels directly against the wind whereby a small retarding force relative to the net forces produced during the other phases of rotation is exerted on the airfoil by the wind.

The airfoil preferably includes a wind capturing flanges extending from the frontal planar portions of the airfoil while the tail of the airfoil provides a wedge-shaped trough for capturing the wind. The airfoil includes aerodynamic surfaces that are symmetrical about a longitudinal axis in the direction of travel, said airfoil having opposite sides being substantial mirror images of each other. The aerodynamic surfaces are substantially planar vertically extending surfaces. The airfoil is constructed from the joinder of two identical pan-shaped airfoils joined back-to-back at opposing planar face portions. The aerodynamic surfaces on each side of the airfoil comprise a planar face portion having leading and trailing edges, a frontal angled planar portion extending forwardly from said leading edge and a rear angled planar portion extending rearwardly from said trailing edge. The airfoil further includes a v-shaped head portion provided by a pointed nosepiece with rearward facing surfaces on each side that cup the wind. In an alternate embodiment of the invention, the windmill includes two airfoils traveling circular paths of different radii. In yet another embodiment of the invention, the longitudinal axis of the airfoil is not tangent to its circular path of travel.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENTS

Figure 1:
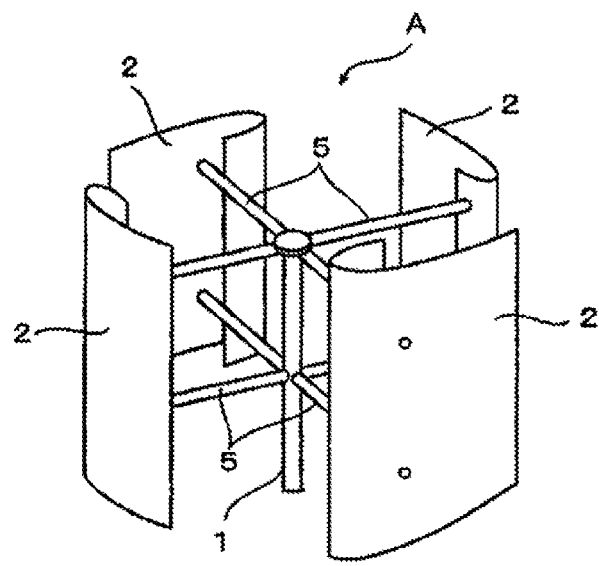
FIG. 1 is a top front isometric view of a prior art vertical windmill showing a typical construction such as utilized by the invention.
Figure 2:
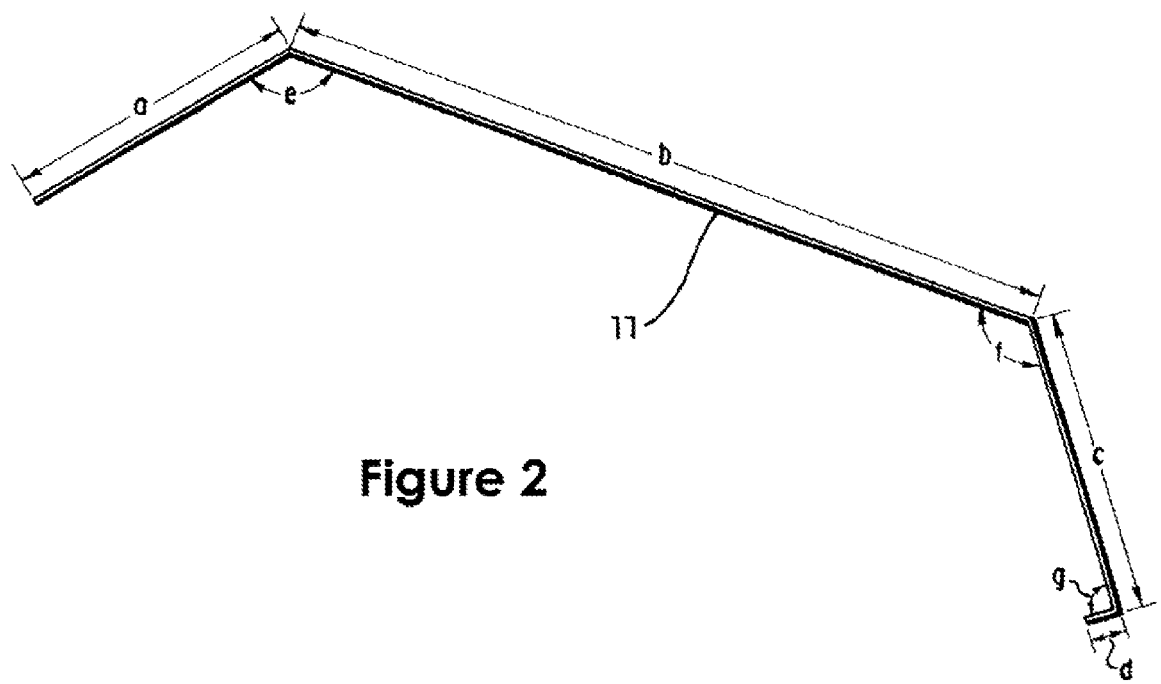
FIG. 2 is a cross-sectional view of a prior art airfoil.
Figure 3:
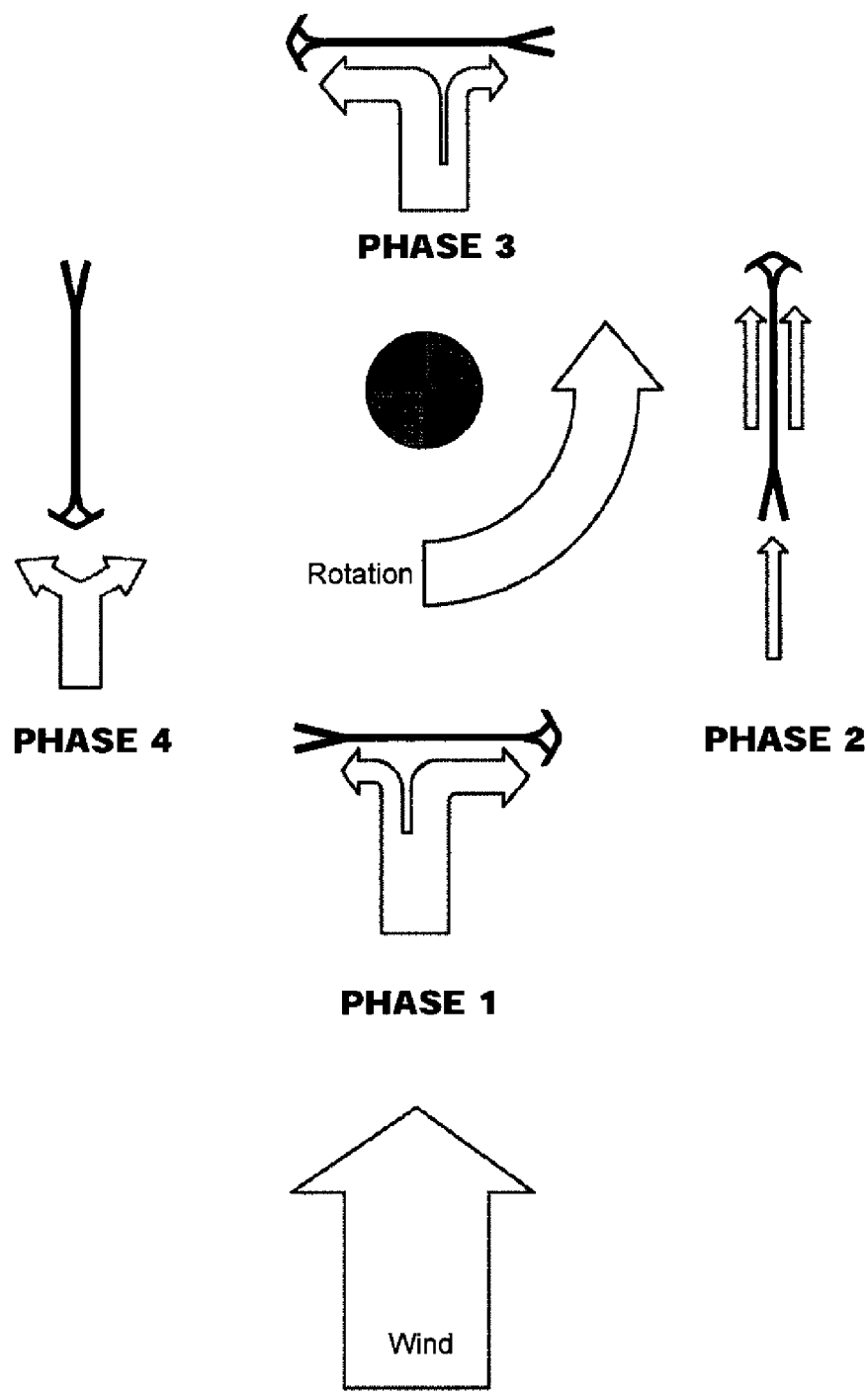
FIG. 3 is a diagram illustrating the four operational phases of the invention.

Referring now to FIG. 3, four phases of a vertical wind turbine utilizing the airfoil or blade of the present invention are depicted, embodied as a four-bladed wind turbine. This cross-sectional diagrammatic plan view of the blades shows their bilateral symmetry and how a net force in the direction of rotation is produced at phase angles 1, 2 and 3, indicated proportionally by force arrows. As shown in FIG. 3, the present invention operates through four phases in each 360 degrees of rotation when wind is randomly presented from a given direction.

During the first phase of rotation, or "Phase 1", unequal forces are produced as the wind orthogonally impacts the face of the airfoil. The unequal Newtonian forces produced push the blade laterally in the direction shown. As the airfoil enters Phase 2 of rotation, a "bucket" effect is produced by the force of air captured by the tail of the airfoil, further pushing the airfoil along in a downwind direction. During Phase 3, forces similar to those in Phase 1 are developed as the free wind passes through the imaginary cylinder formed by the airfoil rotation, and again moves the blade laterally in a direction opposite the direction of travel during Phase 1, thereby moving the blade forward. Finally, in the last phase, the airfoil produces no positive work but rather a small retarding force by traveling directly against the wind, and completes the cycle. The present invention differs from other cylindrically rotating windmills in that force (and thereby torque) is typically generated in only one of the four phases, namely Phase 2 of FIG. 3, whereas the present invention provides a system that produces torque in three of the four phases of rotation, thus significantly increasing the efficiency of cylindrically rotating windmills.

Figure 4:
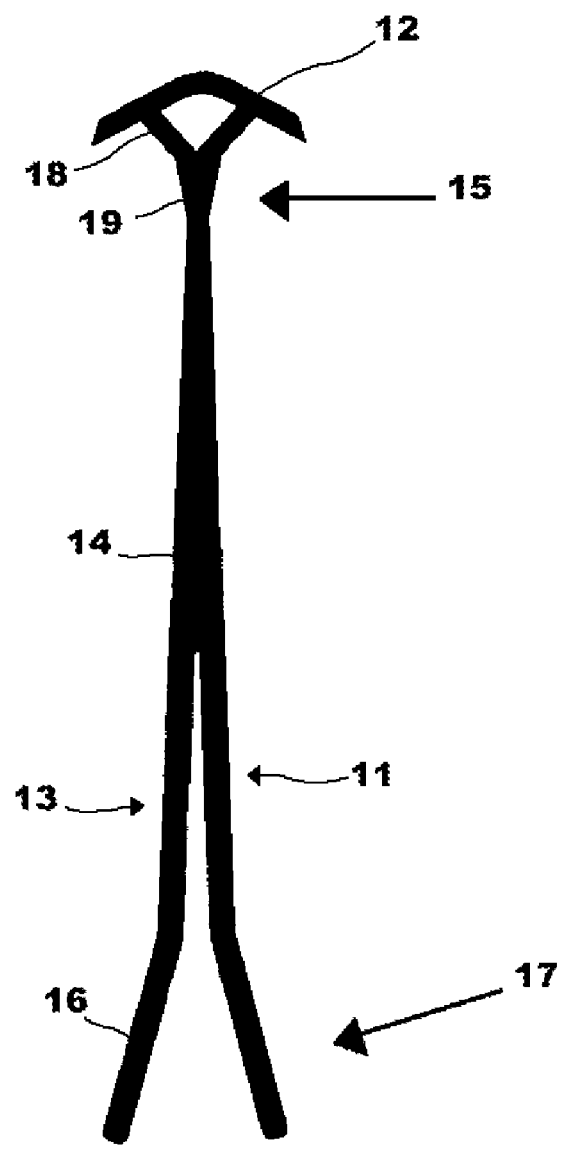
FIG. 4 is a top plan cross-sectional view of an airfoil of the invention.
Figure 4:
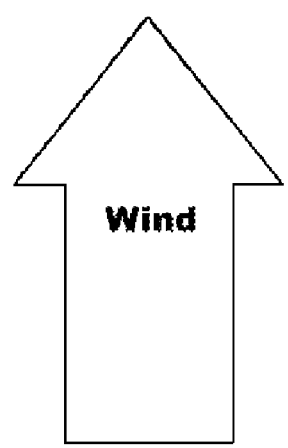

Referring now to FIG. 4, opposite sides of each blade include the same four basic structural elements: namely, an airfoil with opposing sides each including an angled leading edge 19 with a planar face portion 14, a trailing edge 16 and a flange 18. The aerodynamic surfaces of the airfoils are symmetrical about a longitudinal axis in the direction of travel and the opposite sides are substantial mirror images of each other so that description of only one side is necessary for a full understanding of the invention. The top plan cross-sectional view of FIG. 4 depicts a generally arrow-shaped construction with a pointed leading end 15 provided by a v-shaped nosepiece 12. A split tail 17 and the rearward facing flanges 18 provide wedge-shaped troughs for capturing wind. The airfoil, including identical halves 11 and 13, is constructed from the joinder of two identical pan-shaped airfoils joined back-to-back at opposing planar faces. These airfoils each have an angled leading edge 19 with a planar face portion 14, a trailing edge 16 and a flange 18.

Figure 5:
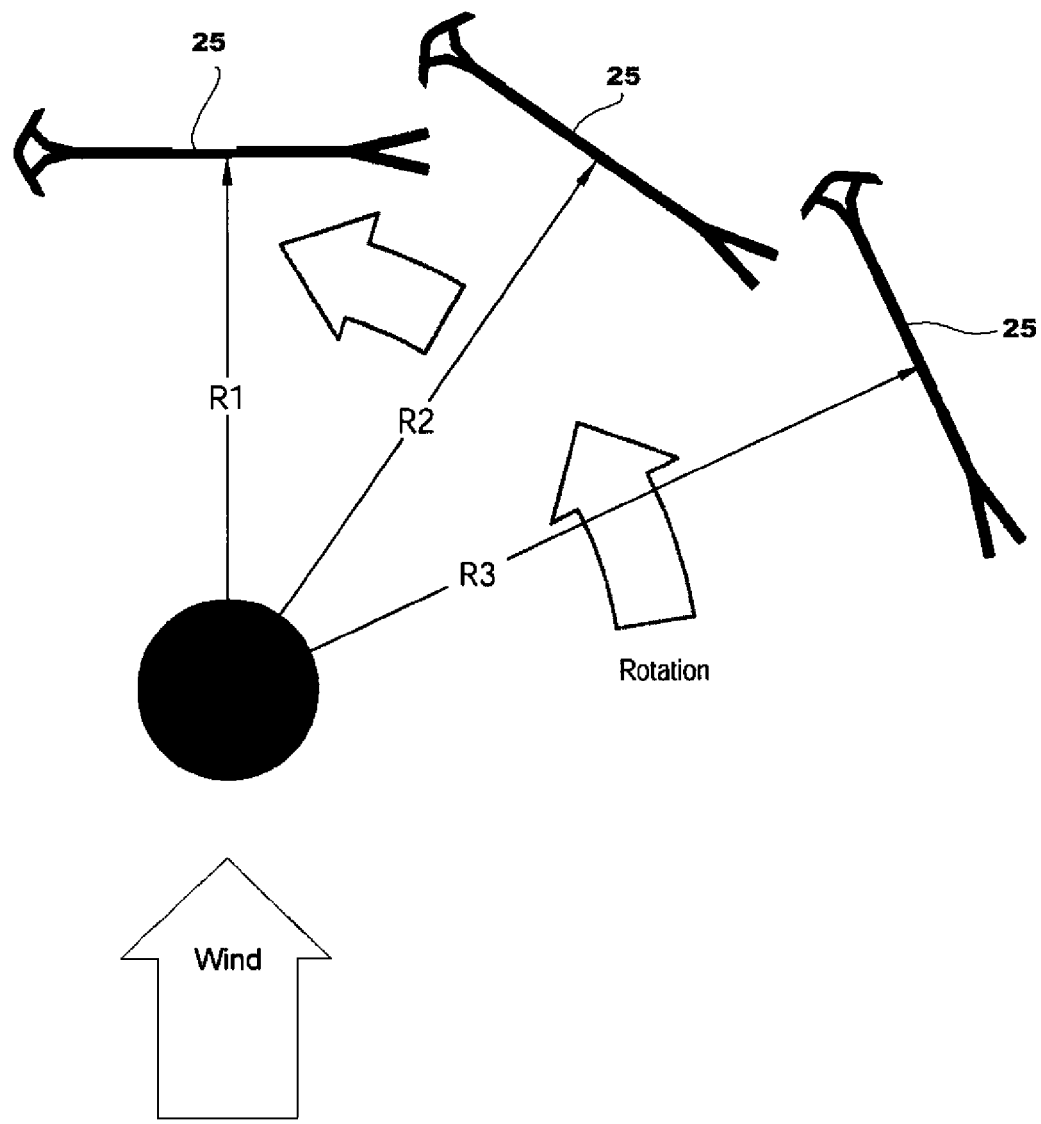
FIG. 5 is a top plan diagram depicting an alternate embodiment of the invention.

It should be noted that the attack angles of the airfoil, that is, the relationship of the angles of a given plane of the airfoil with respect to the direction of the wind flow, may be varied in order to optimize performance and the airfoil position may be offset tangentially relative to the imaginary center of rotation of the cylinder. Furthermore, as shown in FIG. 4 with the arrow indicating wind direction, the trailing edge of the airfoil may be widened to increase the "bucket" effect during Phase 2 and further increase the torque produced. In yet another embodiment, airfoils may be added at greater radii from the center of rotation and staggered (or stacked, much like a bi-wing airplane) to allow air to impact their surfaces and produce additional torque. This is shown in FIG. 5 where the array of blades or airfoils 25 is radially staggered at increasing radii R1, R2 and R3 by utilizing mounting arms of different lengths. Airfoils may be grouped in sets to allow wind to impinge directly on the blades when in Phase 1 and Phase 3 positions as those positions are denoted in FIG. 3.

It is to be understood that the invention is not limited in its application to the details of construction and to the arrangements of the components set forth in the foregoing description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. Therefore, the foregoing is considered as illustrative only of the principles of the invention.

What is claimed as being new and desired to be protected by Letters Patent of the United States is as follows:

What is claimed is:
1. A vertical windmill comprising:
at least one airfoil continuously rotatable about a vertical axis in a direction of rotation, said airfoil having a nosepiece at a leading end and a tail comprising a wedge-shaped trough at a trailing end, said windmill including means for supporting said airfoil so that it travels in a circular path in a horizontal plane about said axis;
said airfoil including aerodynamic surfaces for being driven by wind through four different phases of rotation relative to a wind direction, said phases occurring approximately 90 degrees apart within each 360 degrees of travel of said airfoil about said axis;
a first phase of rotation wherein said airfoil travels laterally across said wind direction during which a forward net driving force is exerted on the airfoil by the wind in a first lateral direction of travel;
a second phase of rotation during which said airfoil travels downwind in the direction of said wind and is driven forward by the force of air captured by the wedge-shaped trough of the tail and rearward facing surfaces on the leading end of said airfoil;
a third phase of rotation in which said airfoil travels laterally across said wind direction in a second lateral direction of travel opposite the direction of travel during said first phase whereby a net forward driving force is exerted on the airfoil by the wind in the second lateral direction of travel; and
a fourth phase of rotation during which said airfoil travels directly against the wind whereby a small retarding force relative to the net forces produced during the other phases of rotation is exerted on the airfoil by the wind.

2. The vertical windmill of claim 1 wherein said airfoil includes aerodynamic surfaces that are symmetrical about a longitudinal axis in the direction of travel, said airfoil having opposite sides being substantial mirror images of each other.

3. The vertical windmill of claim 2 wherein said airfoil comprises substantially planar vertically extending aerodynamic surfaces.

4. The windmill of claim 3 wherein said aerodynamic surfaces on one side of said airfoil comprise a planar face portion having leading and trailing edges, a frontal planar portion extending forwardly from said leading edge and a rear angled planar portion extending rearwardly from said trailing edge.

5. The vertical windmill of claim 1 wherein said airfoil further includes a v-shaped pointed nosepiece.

6. The vertical windmill of claim 5 wherein said airfoil is constructed from the joinder of two identical pan-shaped airfoils joined back-to-hack at opposing planar face portions.

7. The vertical windmill of claim 1 including at least two airfoils traveling circular paths of different radii.

8. The vertical windmill of claim 7 wherein the longitudinal axis of said airfoil is not tangent to its circular path of travel.

9. The vertical windmill of claim 4 further including a wind capturing rearward facing flange extending from said frontal planar portion of said airfoil.

* * * * *